(12) United States Patent
Shinohara et al.

(10) Patent No.: US 9,128,221 B2
(45) Date of Patent: Sep. 8, 2015

(54) LIGHT GUIDE PLATE AND SURFACE LIGHT SOURCE DEVICE

(71) Applicant: OMRON Corporation, Kyoto-shi, Kyoto (JP)

(72) Inventors: Masayuki Shinohara, Nagaokakyou (JP); Kazuhide Hirota, Moriyama (JP); Takako Ishikawa, Kobe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/138,927

(22) Filed: Dec. 23, 2013

(65) Prior Publication Data

US 2014/0176874 A1 Jun. 26, 2014

(30) Foreign Application Priority Data

Dec. 26, 2012 (JP) ................. 2012-283623

(51) Int. Cl.
*G02F 1/1335* (2006.01)
*F21V 8/00* (2006.01)

(52) U.S. Cl.
CPC .............. *G02B 6/002* (2013.01); *G02B 6/0016* (2013.01); *G02B 6/0018* (2013.01); *G02B 6/0038* (2013.01)

(58) Field of Classification Search
CPC ................ G02B 6/0038; G02B 6/0036; G02F 1/133615
USPC ..................... 362/615, 617, 619, 620; 349/65
See application file for complete search history.

(56) References Cited

U.S. PATENT DOCUMENTS

| 8,089,578 B2 * | 1/2012 | Kurata et al. .................... 349/61 |
| 2011/0176089 A1 * | 7/2011 | Ishikawa et al. ................ 349/65 |
| 2011/0304784 A1 * | 12/2011 | Hirota et al. .................... 349/15 |
| 2013/0044514 A1 * | 2/2013 | Chang et al. .................. 362/609 |

FOREIGN PATENT DOCUMENTS

JP        2006-171253 A       6/2006

* cited by examiner

*Primary Examiner* — Thanh-Nhan P Nguyen
(74) *Attorney, Agent, or Firm* — Osha Liang LLP

(57) ABSTRACT

A light guide plate has a light introducing portion configured to confine light that is incident from an end surface, and a light guide-plate main body configured to emit incident light to an outside from a light emitting surface and provided continuously with the light introducing portion in a thickness smaller than a maximum thickness of the light introducing portion. The light introducing portion has an inclined surface inclined toward the light guide-plate main body from a surface comprising a larger thickness than a thickness of the light guide-plate main body, on at least one of a surface at a light emission side and a surface opposite to the surface at the light emission side. The inclined surface has a main-inclined surface configured to be positioned in front of a light source arranged opposite to the end surface.

14 Claims, 13 Drawing Sheets

LIGHT GUIDE PLATE AND SURFACE LIGHT SOURCE DEVICE

CROSS REFERENCE TO RELATED APPLICATIONS

This application claims priority to Japanese Patent Application No. 2012-283623 filed on Dec. 26, 2012, the entire contents of which are incorporated by reference herein.

BACKGROUND

1. Field

The present invention relates to a light guide plate and a surface light source device, and specifically relates to a surface light source device for efficiently making light incident to a light guide plate having a smaller thickness than a height of a light source, and to a light guide plate, and the like.

2. Related Art

In recent years, with a reduction in a thickness of a mobile device that has a surface light source device, a reduction in a thickness of the surface light source device is also being required. To reduce the thickness of the surface light source device, it becomes necessary to reduce a thickness of a light guide plate. However, even when the thickness of a planar light guide plate can be reduced, there is a limit to a reduction in a height of a light source composed of an LED. Therefore, when a thin planar light guide plate is used, the height of the light source becomes larger than a thickness of an end surface (a light-incident end surface) of the light guide plate, and the light source arranged opposite to the light-incident end surface of the light guide plate is protruded to above an upper surface of the light guide plate. When the light source is protruded to above the light guide plate, all of light emitted from the light source does not enter the light incident end face of the light guide plate but a part of the light leaks to the outside of the light guide plate, and light utilization efficiency becomes poor.

FIG. 1A is a perspective view schematically illustrating a conventional surface light source device. A surface light source device 11 in FIG. 1A is configured by a light source 12 and a light guide plate 13, and the light source 12 is arranged opposite to a light-incident end surface 19 of the light guide plate 13. The light guide plate 13 is provided by integrally forming a light guide-plate main body 15 having substantially a uniform thickness and a light introducing portion 14 having a wedge shape. An inclined surface 16 is formed on an upper surface of the light introducing portion 14, and a directional transform pattern 17 (light-leakage prevention patterns) formed of a plurality of V-grooves 18 is formed on the inclined surface 16. A thickness of an end surface (the light-incident end surface 19) of the light introducing portion 14 is larger than a height of the light source 12. As a surface light source device that uses a light guide plate having such a structure, there is a one disclosed in Japanese Unexamined Patent Publication No. 2006-171253, for example.

In the surface light source device 11, light emitted from the light source 12 is incident from the light-incident end surface 19 into the light introducing portion 14. Since the thickness of the end surface (the light-incident end surface 19) of the light introducing portion 14 is larger than the height of the light source 12, the light emitted from the light source 12 is efficiently taken into the light introducing portion 14. The light incident to the light introducing portion 14 is reflected by the upper surface (the inclined surface 16) or a lower surface of the light introducing portion 14, is guided to the light guide-plate main body 15, and is emitted to an outside from a light emitting surface 20 of the light guide-plate main body 15.

In this case, when the inclined surface 16 is flat, there is a risk that a part of the light that is incident to the light introducing portion 14 leaks to an outside by being transmitted through the inclined surface 16, without being reflected by the inclined surface 16. Therefore, in the surface light source device 11, light leakage from the inclined surface 16 is reduced by providing the directional transform pattern 17 on the inclined surface 16. That is, in the surface light source device 11, because the V-grooves 18 as shown in FIG. 1B are provided on the inclined surface 16, an incidence angle of the light incident to the V-grooves 18 becomes large like light L indicated by solid line arrows, and the light L is reflected by the V-grooves 18 and does not easily leak from the inclined surface 16. As a result, according to the surface light source device 11 in such a structure, it becomes possible to improve light utilization efficiency and reduce the thickness of the surface light source device.

However, even when the directional transform pattern 17 formed of the plurality of V-grooves 18 is provided on the inclined surface 16, light leakage from the inclined surface 16 occurs as shown in FIG. 1B (of the light L that is incident to the light introducing portion 14, the light that leaks to an outside is indicated by broken-line arrows). FIG. 1B is a schematic view illustrating behaviors of the light L in high light intensity that is emitted from a light emission center 12a. Of the light emitted from the light emission center 12a, the light L emitted substantially forward from the light emission center 12a is reflected from both a groove slant surface 18a that faces a center surface C (a flat surface that passes through the light emission center C of the light source and is perpendicular to a light-incident end surface 19 and a light emitting surface 20 is referred to as the center surface C) and a groove slant surface 18b that faces opposite to the center surface C as indicated by solid-line arrows, and is not easy to leak from the inclined surface 16. On the other hand, in the surface light source device 11, the directional transform pattern 17 has V-grooves of the same shapes having bilaterally symmetrical cross-sectional shapes that are repeatedly arranged, as shown in FIG. 1B. Therefore, the light L obliquely emitted from the light emission center 12a becomes easy to leak to an outside as indicated by the broken-line arrows. That is, when a position where the light is incident to the directional transform pattern 17 becomes far from the center surface C, the light L becomes incident to the groove slant surface 18b, on which a normal line faces opposite to the center surface C, at an angle gradually nearer perpendicular to the groove slant surface 18b. Accordingly, the light L easily leaks from the groove slant surface 18b.

SUMMARY

One or more embodiments of the present invention makes light difficult to leak from directional transform patterns formed on inclined surfaces, in a surface light source device having the inclined surfaces at a light introducing portion of a light guide plate.

A light guide plate according to one or more embodiments of the present invention includes a light introducing portion configured to confine light that is incident from an end surface, and a light guide-plate main body configured to make incident light emit to an outside from a light emitting surface and provided continuously with the light introducing portion in a thickness smaller than a maximum thickness of the light introducing portion. The light introducing portion includes an inclined surface inclined toward the light guide-plate main body from a surface having a larger thickness than a thickness of the light guide-plate main body, on at least one of a surface at a light emission side and a surface opposite to the surface at the light emission side. The inclined surface includes a main-inclined surface positioned in front of a light source arranged opposite to the end surface, the main-inclined surface having an average direction of normal lines oriented to a direction perpendicular to the end surface when viewed from a thickness direction, and side-inclined surfaces positioned at both sides of the main-inclined surface, each side-inclined surface having an average direction of normal lines inclined to the main inclined surface when viewed from the thickness direction. Directional transform patterns are formed on the main-inclined surface and on the side-inclined surfaces at both sides of the main-inclined surface. According to one or more embodiments of the present invention, the side-inclined surfaces are formed continuously with the main-inclined surface. According to one or more embodiments of the present invention, the directional transform patterns are configured as a layout of pattern elements that linearly extend.

In a light guide plate according to one or more embodiments of the present invention, the side-inclined surfaces on which the average directions of normal lines are inclined to the main inclined surface when viewed from a thickness direction are provided at both sides of the main-inclined surface, and the directional transform patterns are formed on the main-inclined surface and on the side-inclined surfaces at both sides of the main-inclined surface. Therefore, light leakage from the inclined surface near a side surface of the light guide plate can be reduced.

In a light guide plate according to one or more embodiments of the present invention, the pattern elements that configure the directional transform patterns formed on the side-inclined surfaces have bilaterally asymmetrical cross-sectional shapes. According to one or more embodiments of the present invention, the directional transform patterns of the side-inclined surfaces are formed such that a ridge line and a valley line are alternately arranged and that a slant surface is formed between the ridge line and the valley line, and that, of adjacent ones of the slant surfaces, a slant surface on which an outward normal line is further oriented to a center of the light guide plate than a direction perpendicular to the pattern-element layout direction has a smaller width parallel to a pattern-element layout direction than that of a slant surface on which an outward normal line is oriented to an outer side of the light guide plate than a direction perpendicular to the pattern-element layout direction. According to the above, light leakage from the inclined surface near the side surface of the light guide plate can be further reduced.

In a light guide plate according to one or more embodiments of the present invention, the pattern elements that configure the directional transform pattern formed on the main-inclined surface have bilaterally asymmetrical cross-sectional shapes. According to one or more embodiments of the present invention, the directional transform pattern of the main-inclined surface is formed such that a ridge line and a valley line are alternately arranged and that a slant surface is formed between the ridge line and the valley line, and that, of adjacent ones of the slant surfaces, a slant surface on which an outward normal line is oriented to a center of the light guide plate has a larger width parallel to a pattern-element layout direction than that of a slant surface on which an outward normal line is oriented to an outside of the light guide plate. According to the above, light leakage from an inclined surface in a front region of the light source can be reduced.

For a structure of an inclined surface of which both sides are bent, upper end edges and lower end edges of the side-inclined surfaces may be inclined to the end surface, viewed from a thickness direction, for example. Further, upper end edges of the side-inclined surfaces may be inclined to the end surface, and lower end edges of the side-inclined surfaces may be parallel with the end surface, viewed from a thickness direction. Further, upper end edges of the side-inclined surfaces may be parallel with the end surface, and lower end edges of the side-inclined surfaces may be inclined to the end surface, viewed from a thickness direction.

A surface light source device according to one or more embodiments of the present invention includes the light guide plate according to one or more embodiments of the present invention, and a light source configured to transmit light to the end surface of the light introducing portion of the light guide plate. In the surface light source device according to one or more embodiments of the present invention, since the light guide plate according to one or more embodiments of the present invention is used, light leakage from the inclined surface can be reduced and brightness of the light emitting surface can be improved.

The light guide plate according to one or more embodiments of the present invention can be used for a liquid-crystal display device, and a screen of the liquid-crystal display device can be made bright by improving light utilization efficiency of the surface light source device.

The liquid-crystal display device according to one or more embodiments of the present invention can be also used in a mobile device such as a smartphone, a tablet computer, an electronic book reader, and an electronic dictionary.

Embodiments of the present invention are not limited to the above. Additionally, embodiments of the present invention may be formed by combining any of the above elements.

DETAILED DESCRIPTION

Embodiments of the present invention are described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Additionally, the present invention is not limited to the following embodiments, and can be variously modified within a range without deviating from the scope of the present invention.

First Embodiment

Figure 1A:
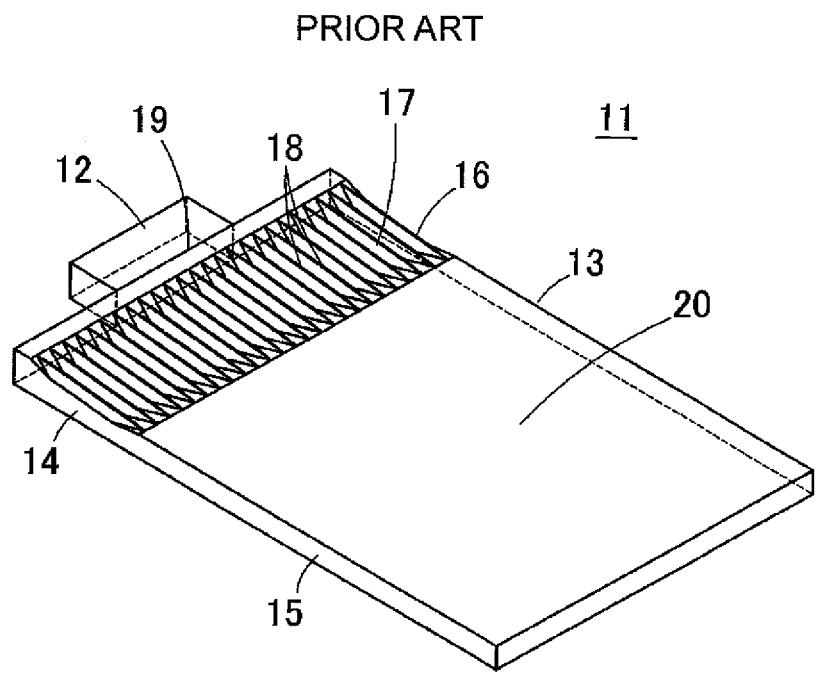
FIG. 1A is a perspective view of an example of a conventional surface light source device.
Figure 1B:
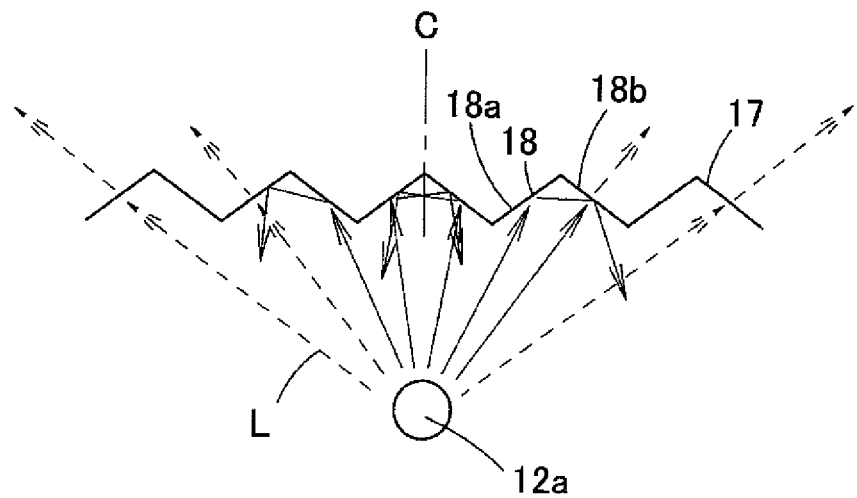
FIG. 1B is a schematic view for explaining behaviors of light incident to a directional transform pattern of the surface light source device in FIG. 1A.
Figure 2A:
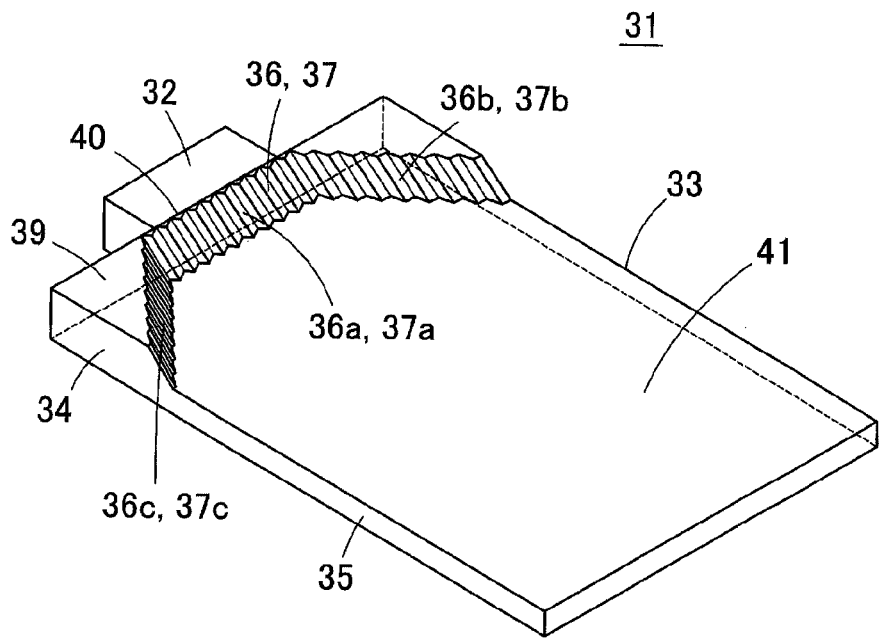
FIG. 2A is a perspective view of a surface light source device according to a first embodiment of the present invention.
Figure 2B:
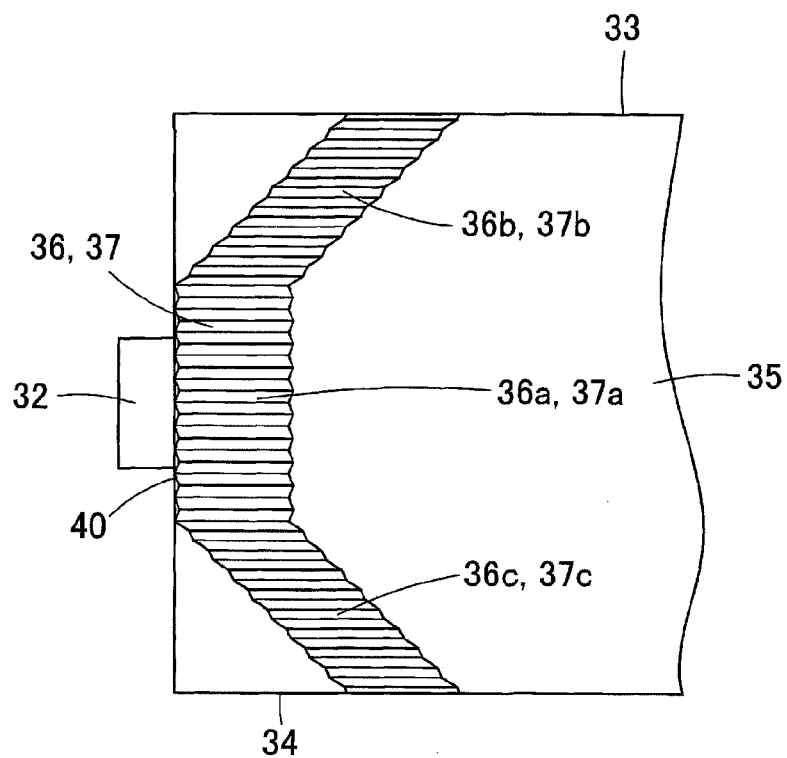
FIG. 2B is a partially-broken-down plan view of the surface light source device in FIG. 2A.
Figure 3A:
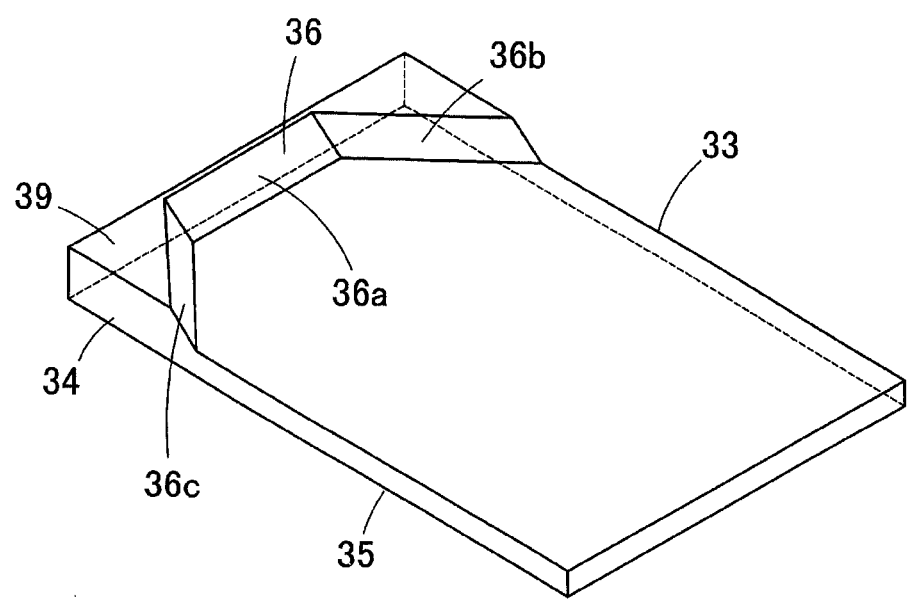
FIG. 3A is a perspective view of the surface light source device in FIG. 2A excluding a directional transform pattern of an inclined surface.
Figure 3B:
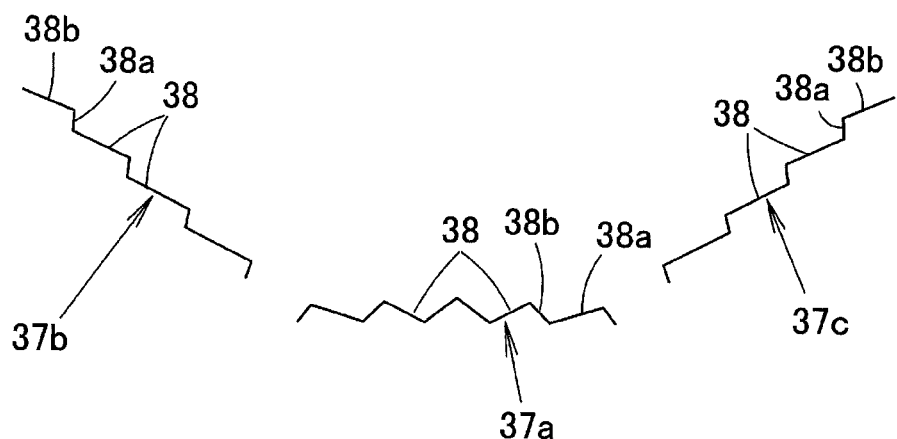
FIG. 3B shows a cross-sectional shape of each portion of the directional transform pattern in the surface light source device in FIG. 2A.

A structure of a surface light source device according to a first embodiment of the present invention is described below with reference to FIGS. 2A and 2B, and FIGS. 3A and 3B. FIGS. 2A and 2B are a perspective view and a partially-broken-down plan view of a surface light source device 31 according to the first embodiment of the present invention, respectively. FIG. 3A is a perspective view of the surface light source device 31 excluding a directional transform pattern 37 of an inclined surface 36 of the surface light source device 31. That is, FIG. 3A is a perspective view of the surface light source device 31 in FIG. 2A in which the directional transform pattern 37 is replaced by a flat surface (an envelope surface) that is in contact with a ridge line of the directional transform pattern 37. FIG. 3B is a schematic view of a cross-sectional shape of each portion (directional transform patterns 37a, 37b, and 37c) of the directional transform pattern 37 formed in the surface light source device 31.

The surface light source device 31 is formed of a light source 32 and a light guide plate 33. The light source 32 incorporates one or a plurality of LEDs, and emits white light from a light emission window at a front side. This light source 32 is also referred to as a point light source.

The light guide plate 33 has a light introducing portion 34 provided at an end part of a light guide-plate main body 35. The light guide plate 33 is formed of a transparent resin having a high refractive index such as an acrylic resin, a polycarbonate resin (PC), cycloolefin resin, and polymethylmethacrylate (PMMA).

The light introducing portion 34 is a portion having a large thickness in the light guide plate 33, and the light source 32 is arranged opposite to a light-incident end surface 40 as an end surface of the light guide plate 33. A thickness of the light-incident end surface 40 is equal to or larger than a height of the light emission window of the light source 32. Therefore, light emitted from the light source 32 is efficiently incident from the light-incident end surface 40 into the light introducing portion 34, and light utilization efficiency of the surface light source device 31 is improved.

As shown in FIG. 3A, in front of a center portion of the light-incident end surface 40, that is, in a front region of the light source 32, a main-inclined surface 36a inclined from an upper surface of the light introducing portion 34 toward an upper surface of the light guide-plate main body 35 is provided. The main-inclined surface 36a is an inclined flat surface, and a direction of a normal line erected on the main-inclined surface 36a is oriented to a direction perpendicular to the light-incident end surface 40, viewed from a thickness direction of the light guide plate 33 (a direction perpendicular to a light emitting surface 41).

At both sides of the main-inclined surface 36a, there are provided side-inclined surfaces 36b and 36c that are inclined downward from the upper surface of the light introducing portion 34 toward the upper surface of the light guide-plate main body 35. The side-inclined surfaces 36b and 36c are inclined flat surfaces, and directions of normal lines erected on the side-inclined surfaces 36b and 36c are inclined to a direction of the main-inclined surface 36a (or, the center surface C of the light guide plate 33), respectively, viewed from a thickness direction of the light guide plate 33.

The side-inclined surfaces 36b and 36c are formed continuously with the main-inclined surface 36a. Therefore, the inclined surface 36 formed of the main-inclined surface 36a and the side-inclined surfaces 36b and 36c at right and left sides has a shape that both sides are bent. Further, upper end edges of the inclined surface 36 are bent in a ship-bottom shape, and a horizontal surface 39 parallel with a lower surface of the light introducing portion 34 is formed at corner portions of the upper surface of the light introducing portion 34. Lower end edges of the inclined surface 36, that is, a boundary between the light introducing portion 34 and the light guide-plate main body 35, are also bent in a ship-bottom shape.

A directional transform pattern 37a is formed on the main-inclined surface 36a. The directional transform pattern 37a is configured by a layout of pattern elements 38 having V-groove shapes, and slant surfaces (groove slant surfaces 38a and 38b) are formed between ridge lines and valley lines. Each pattern element 38 extends to a direction perpendicular to the light-incident end surface 40, viewed from a thickness direction of the light guide plate 33, and is arranged in a width direction of the main-inclined surface 36a so as to become parallel to each other. As shown in FIG. 3B, the pattern elements 38 of the directional transform pattern 37a have bilaterally asymmetrical cross-sectional shapes.

Directional transform patterns 37b and 37c are formed on the side-inclined surfaces 36b and 36c, respectively. Each of the directional transform patterns 37b and 37c is configured by a layout of the pattern elements 38 having V-groove shapes, and the slant surfaces (groove slant surfaces 38a and 38b) are formed between ridge lines and valley lines. Each pattern element 38 extends to a direction perpendicular to the light-incident end surface 40, viewed from a thickness direction of the light guide plate 33, and is arranged in a width direction of the directional transform patterns 37b and 37c so as to become parallel to each other. As shown in FIG. 3B, the pattern elements 38 of the directional transform patterns 37b and 37c have bilaterally asymmetrical cross-sectional shapes.

In this way, the directional transform pattern 37 formed of the directional transform patterns 37a, 37b, and 37c is formed on a whole of the inclined surface 36.

Although not shown in the drawings, a light emitting unit for emitting light that guides in the light guide-plate main body 35 from the light emitting surface 41 is provided on a surface opposite to the light emitting surface 41 of the light guide-plate main body 35. The light emitting unit is formed in a prism-shaped pattern, by sandblasting, spreading ink, and in a diffraction grating pattern, and the like (see FIG. 12). At a lower surface side of the light guide plate 33, there is provided a reflection plate that makes light, which leaked from the lower surface of the light guide plate 33, incident again to the light guide plate 33 (see FIG. 12).

Figure 4:
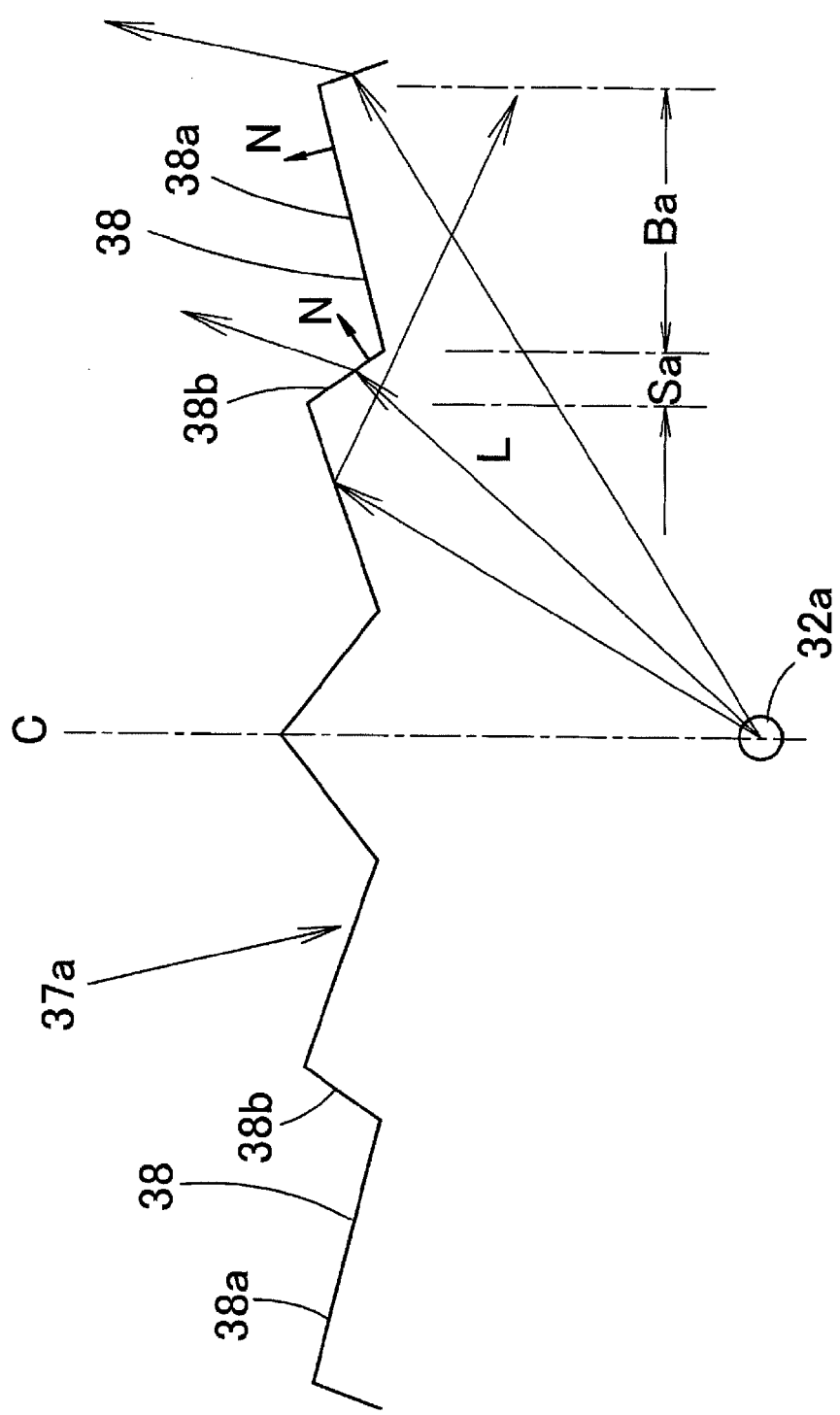
FIG. 4 is a schematic view for explaining behaviors of light incident to a directional transform pattern positioned at a front side viewed from a light source.

Work of the directional transform pattern 37 in the inclined surface 36 will be described next. In the directional transform pattern 37a, each pattern element 38 has a bilaterally asymmetrical cross-sectional shape in a cross section perpendicular to the ridge line of the pattern element 38 (hereinafter, simply referred to as a cross section). That is, as shown in FIG. 4, in two groove slant surface 38a and 38b that constitute the pattern element 38 in a V-groove shape, a width Ba of the groove slant surface 38a on which a normal line N erected is oriented to the center surface C is larger than a width Sa of the groove slant surface 38b on which a normal line N erected is oriented to opposite to the center surface C.

Therefore, in the directional transform pattern 37a, a proportion of an area (a total value) of each groove slant surface 38a becomes large, and a proportion of an area (a total value) of each groove slant surface 38b becomes small. Therefore, a large portion of light emitted from a light emission center 32a is totally reflected by the groove slant surface 38a, and even when the light emitted from the light emission center 32a leaks from the groove slant surface 38b, a leakage amount of the light becomes small.

Figure 5A:
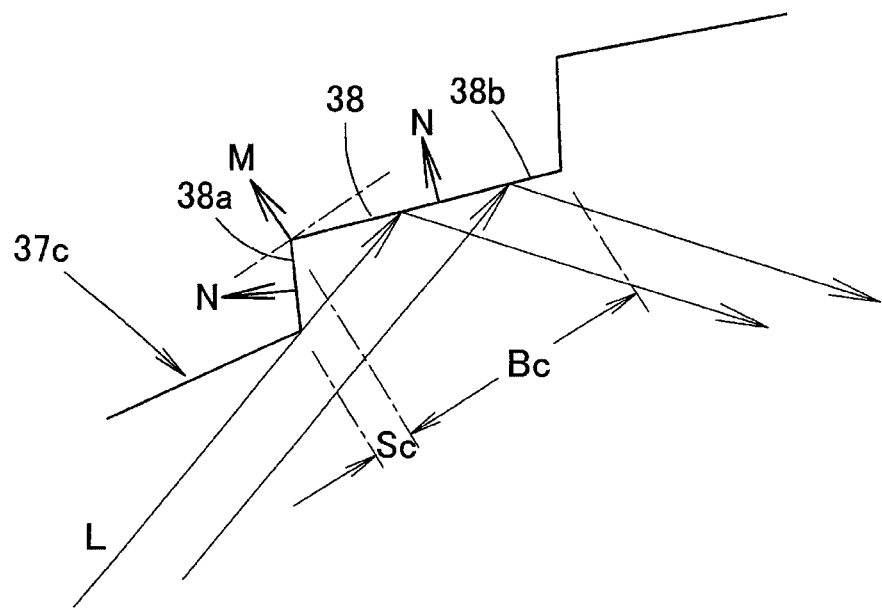
FIG. 5A is a schematic view for explaining behaviors of light incident to a directional transform pattern positioned at the right side viewed from a light source.

In the directional transform patterns 37b and 37c, a cross-sectional shape of each pattern element 38 is also bilaterally asymmetrical. While FIG. 5A illustrates the directional transform pattern 37c, the directional transform pattern 37b has a shape symmetrical with the directional transform pattern 37c with respect to the center surface C. In the directional transform patterns 37b and 37c, the width Bc of the groove slant surface 38b on the surface of which the normal line N erected is further oriented to opposite to the center surface C than a normal line M with respect to the normal line M erected on the side-inclined surface 36b is larger than the width Sc of the groove slant surface 38a on which the normal line N erected is further oriented to the center surface C than the normal line M with respect to the normal line M erected on the side-inclined surface 36b.

Figure 5B:
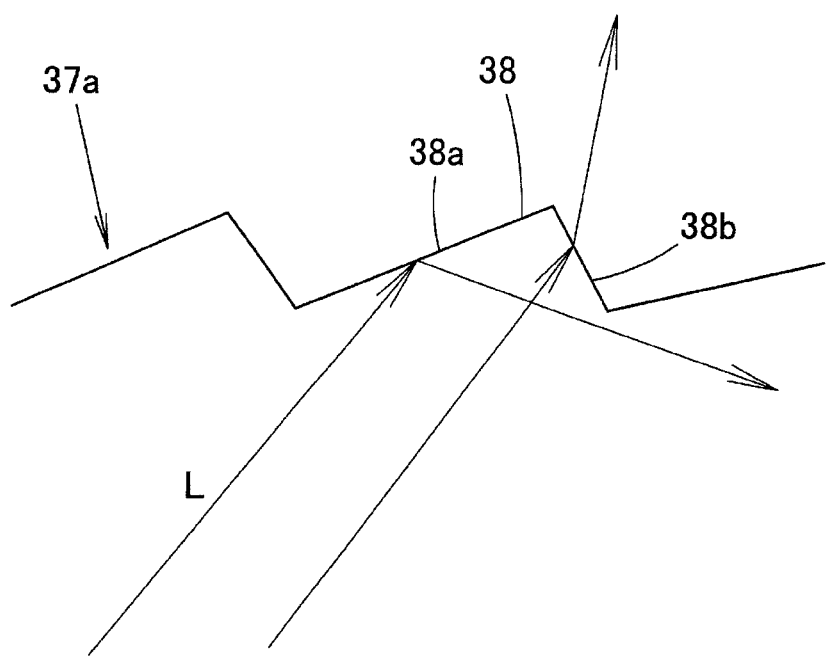
FIG. 5B is a schematic view for explaining behaviors of light incident to a directional transform pattern in a comparative example.

When the directional transform pattern 37a extends to an end of the light guide plate 33 in a width direction, as shown in FIG. 5B, the light L easily leaks from the groove slant surface 38b. However, when the side-inclined surfaces 36b and 36c are bent in advance as shown in FIG. 5A, the light does not easily leak. That is, the groove slant surface 38a from which the light L easily leaks is shielded by the groove slant surface 38b, and light becomes not easily incident to the groove slant surface 38a. Therefore, light leakage is reduced.

In a surface light source device 31 according to one or more embodiments of the present invention, since light leakage is reduced as described above, loss of light reduces, and light utilization efficiency improves.

(Modification)

Figure 6A:
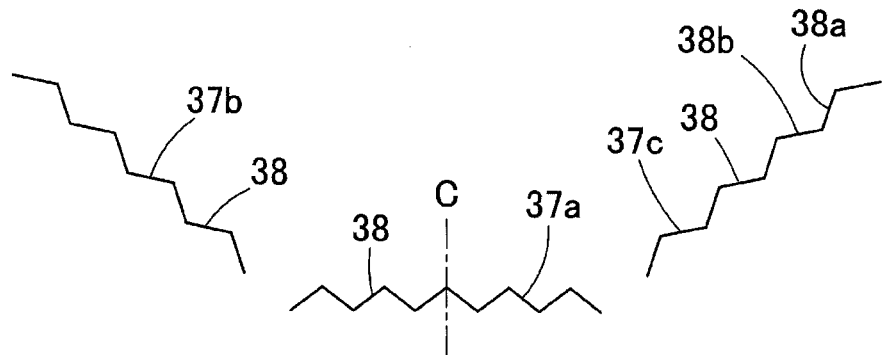
FIGS. 6A, 6B, and 6C are cross-sectional views illustrating different shape of directional transform patterns in the surface light source device in FIG. 2A.
Figure 6B:
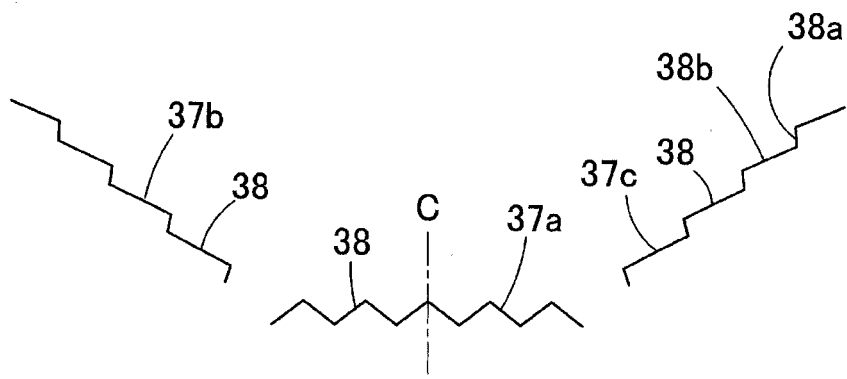
Figure 6C:
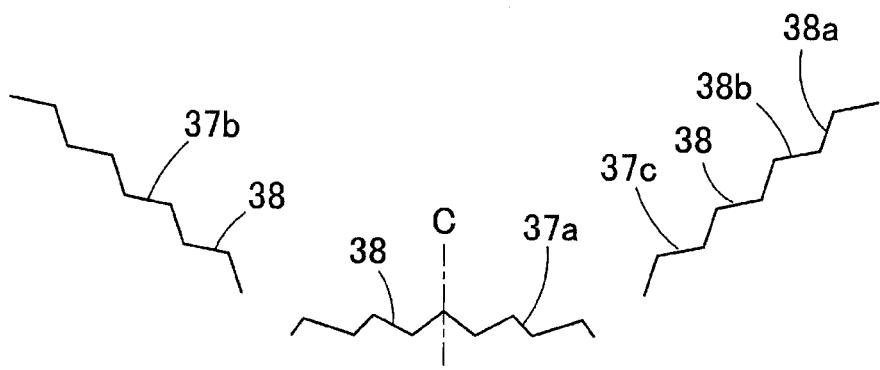

FIGS. 6A, 6B, and 6C are cross-sectional views illustrating different shapes of the directional transform patterns 37. In FIG. 6A, the directional transform pattern 37a formed on the main-inclined surface 36a is configured by the pattern elements 38 having bilaterally symmetrical cross-sectional shapes. The directional transform patterns 37b and 37c formed on the side-inclined surfaces 36b and 36c are also configured by the pattern elements 38 having bilaterally symmetrical cross-sectional shapes. In the directional transform pattern 37 in such a structure, an incidence angle of light incident to one groove slant surface 38b can be also made small by providing the directional transform patterns 37b and 37c at both the right and left side portions, and light becomes not easily incident to the other groove slant surface 38a. Therefore, light leakage from the directional transform patterns 37b and 37c can be made small.

In FIG. 6B, the directional transform pattern 37a formed on the main-inclined surface 36a is configured by the pattern elements 38 having bilaterally symmetrical cross-sectional shapes. The directional transform patterns 37b and 37c formed on the side-inclined surfaces 36b and 36c are configured by the pattern elements 38 having bilaterally asymmetrical cross-sectional shapes in a similar manner to that in the first embodiment. In the directional transform pattern 37 in such a structure, light leakage from the directional transform patterns 37b and 37c at both the right and left side portions can be made small in a similar manner to that in the first embodiment.

In FIG. 6C, the directional transform pattern 37a formed on the main-inclined surface 36a is configured by the pattern elements 38 having bilaterally asymmetrical cross-sectional shapes in a similar manner to that in the first embodiment, and the directional transform patterns 37b and 37c formed on the side-inclined surfaces 36b and 36c are configured by the pattern elements 38 having bilaterally symmetrical cross-sectional shapes. In the directional transform pattern 37 in such a structure, light leakage from the directional transform pattern 37a at a center can be made small, and light leakage from the directional transform patterns 37b and 37c at both the right and left side portions can be made small.

Second Embodiment

Figure 7A:
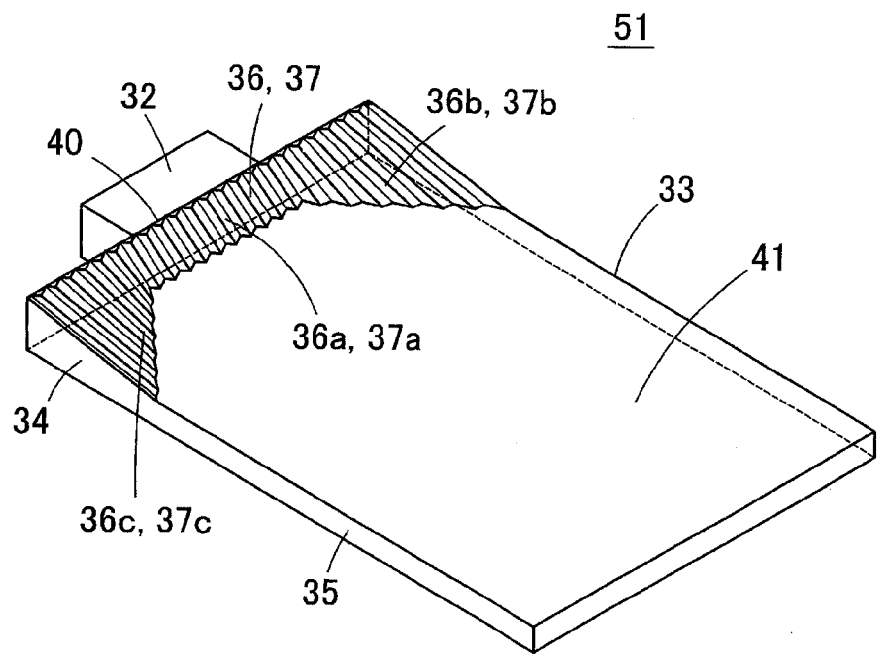
FIG. 7A is a perspective view of a surface light source device according to a second embodiment of the present invention.
Figure 7B:
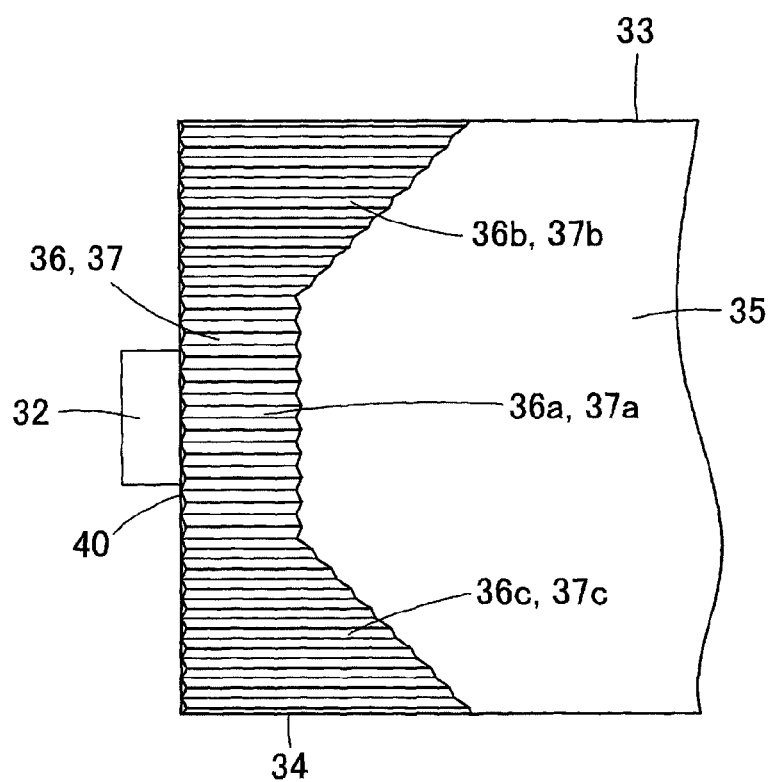
FIG. 7B is a partially-broken-down plan view of the surface light source device in FIG. 7A.
Figure 8:
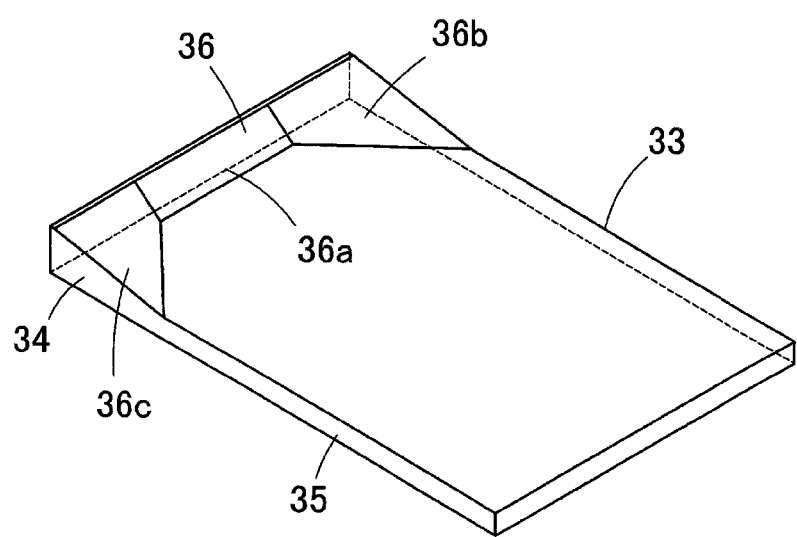
FIG. 8 is a perspective view of the surface light source device in FIG. 7A excluding a directional transform pattern of an inclined surface.

FIGS. 7A and 7B are a perspective view and a partially-broken-down plan view of a surface light source device 51 according to the second embodiment of the present invention, respectively. FIG. 8 is a perspective view of the surface light source device 51, showing only the inclined surface 36 by excluding the directional transform pattern 37. That is, FIG. 8 is a perspective view of the surface light source device 31 in FIG. 7A in which the directional transform pattern 37 is replaced by a flat surface (an envelope surface) that is in contact with a ridge line of the directional transform pattern 37.

In the surface light source device 51, the side-inclined surfaces 36b and 36c are also provided at both sides of the main-inclined surface 36a, as shown in FIG. 8. Average directions of normal lines erected on the side-inclined surfaces 36b and 36c are inclined to a direction of the main-inclined surface 36a (or the center surface C of the light guide plate 33), viewed from a thickness direction of the light guide plate 33. Therefore, the inclined surface 36 formed of the main-inclined surface 36a and the side-inclined surfaces 36b and 36c at right and left sides has a shape that both sides are bent.

Viewed from a thickness direction of the light guide plate 33, upper end edges of the inclined surface 36 are a linear, and lower end edges of the inclined surface 36, that is, a boundary between the light introducing portion 34 and the light guide-plate main body 35, are bent in a ship-bottom shape. In this case, the side-inclined surfaces 36b and 36c may be flat surfaces, or twisted curved surfaces.

In the surface light source device 51, light leakage from both side portions of the inclined surface 36 can be also reduced.

Structures of the directional transform patterns 37a, 37b, and 37c provided on the main-inclined surface 36a and the side-inclined surfaces 36b and 36c are similar to those in the first embodiment and the modification of the first embodiment (see FIGS. 4 to 6).

Third Embodiment

Figure 9A:
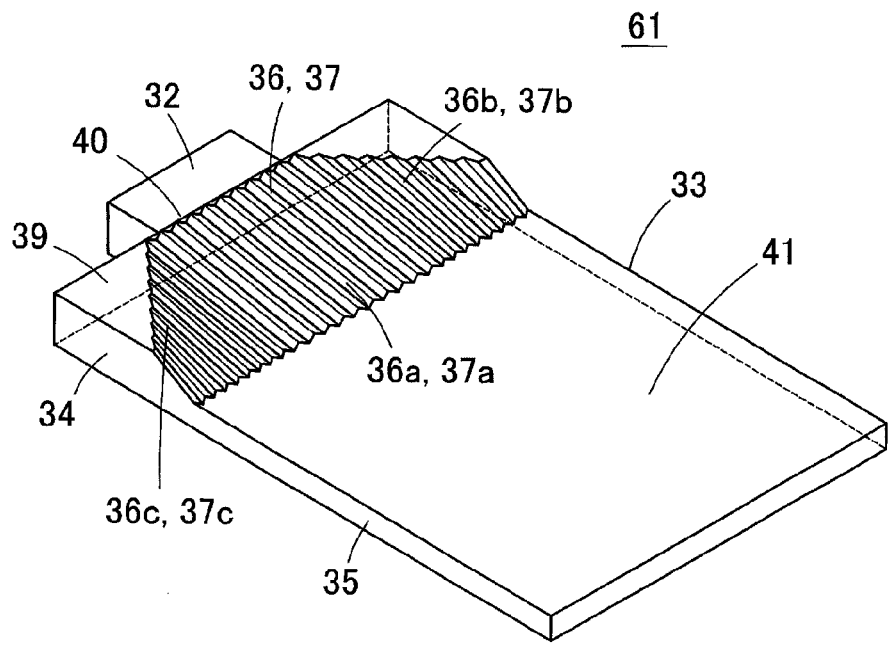
FIG. 9A is a perspective view of a surface light source device according to a third embodiment of the present invention.
Figure 9B:
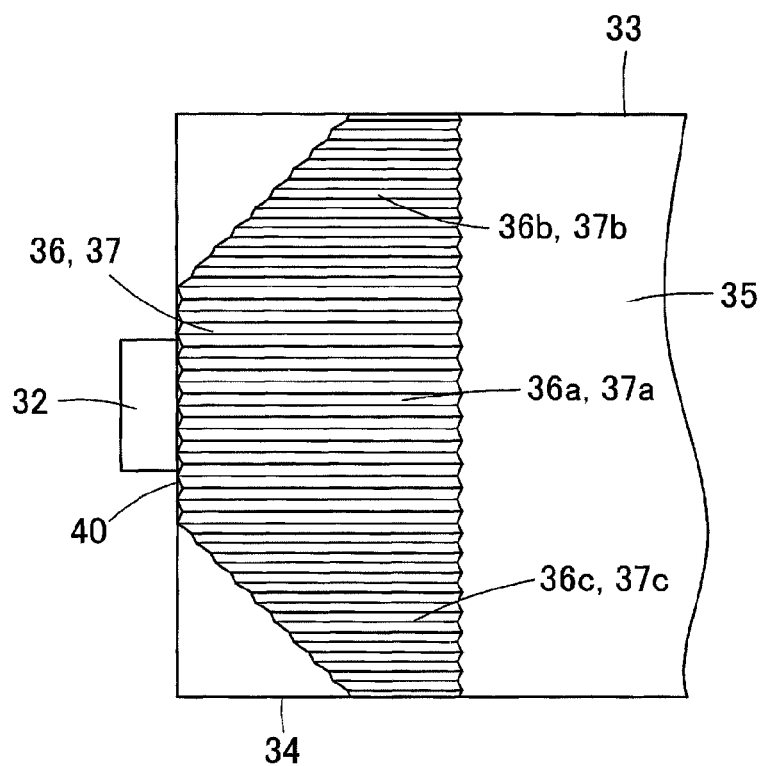
FIG. 9B is a partially-broken-down plan view of the surface light source device in FIG. 9A.
Figure 10:
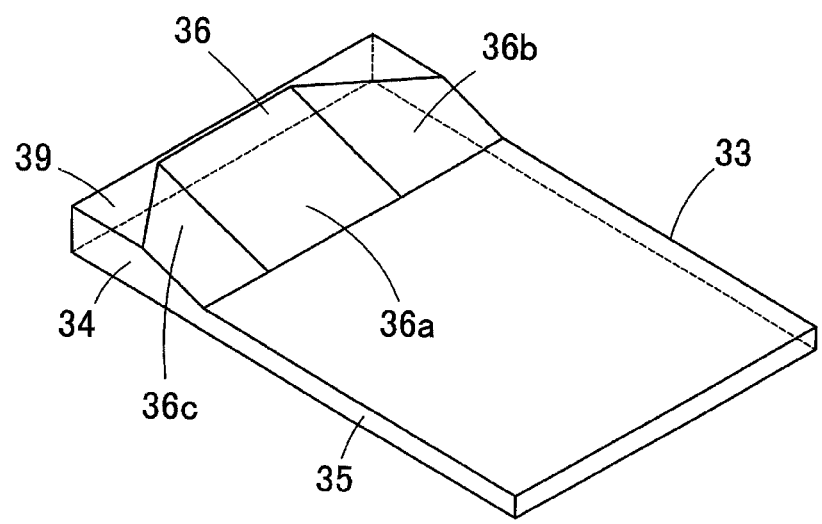
FIG. 10 is a perspective view of the surface light source device in FIG. 9A excluding a directional transform pattern of an inclined surface.

FIGS. 9A and 9B are a perspective view and a partially-broken-down plan view of a surface light source device 61 according to a third embodiment of the present invention, respectively. FIG. 10 is a perspective view of the surface light source device 61, showing only the inclined surface 36 excluding the directional transform pattern 37.

In the surface light source device 61, the side-inclined surfaces 36b and 36c are also provided at both sides of the main-inclined surface 36a, as shown in FIG. 10. Average directions of normal lines erected on the side-inclined surfaces 36b and 36c are inclined to a direction of the main-inclined surface 36a (or the center surface C of the light guide plate 33), viewed from a thickness direction of the light guide plate 33. Therefore, the inclined surface 36 formed of the main-inclined surface 36a and the side-inclined surfaces 36b and 36c at right and left sides has a shape that both sides are bent.

Further, viewed from a thickness direction of the light guide plate 33, upper end edges of the inclined surface 36 are bent in a ship-bottom shape, and lower end edges of the inclined surface 36, that is, boundaries between the light introducing portion 34 and the light guide-plate main body 35, are in a liner shape. In this case, the side-inclined surfaces 36b and 36c may be flat surfaces, or twisted curved surfaces.

In the surface light source device 61, light leakage from both side portions of the inclined surface 36 can be also reduced.

In the third embodiment, structures of the directional transform patterns 37a, 37b, and 37c provided on the main-inclined surface 36a and the side-inclined surfaces 36b and 36c are also similar to those in the first embodiment and the modification of the first embodiment (see FIGS. 4 to 6).

Fourth Embodiment

Figure 11:
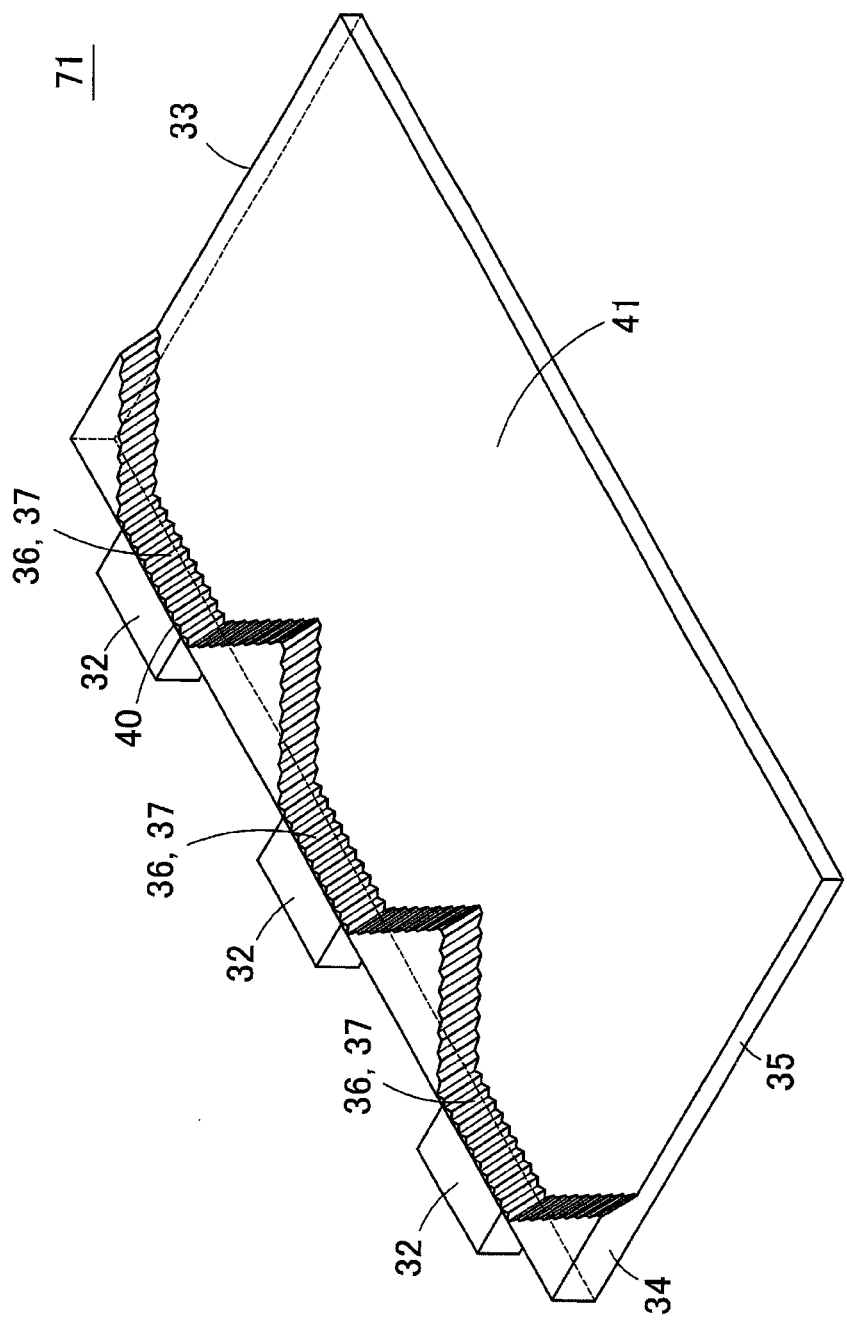
FIG. 11 is a perspective view of a surface light source device according to a fourth embodiment of the present invention.

FIG. 11 is a perspective view of a surface light source device 71 according to a fourth embodiment of the present invention. In the surface light source device 71, a plurality of light sources 32 are used for one light guide plate 33. That is, the plurality of light sources 32 are arranged at a constant interval opposite to the light-incident end surface 40 of the light guide plate 33. On the light guide plate 33, inclined surfaces 36 and directional transform patterns 37 are formed opposite to respective light sources 32. According to the fourth embodiment, it is possible to manufacture a surface light source device having a large illumination region. A light guide plate structure that becomes a basis of the surface light source device 71 may be a light guide plate according to one or more embodiments of the present invention.

Fifth Embodiment

Figure 12:
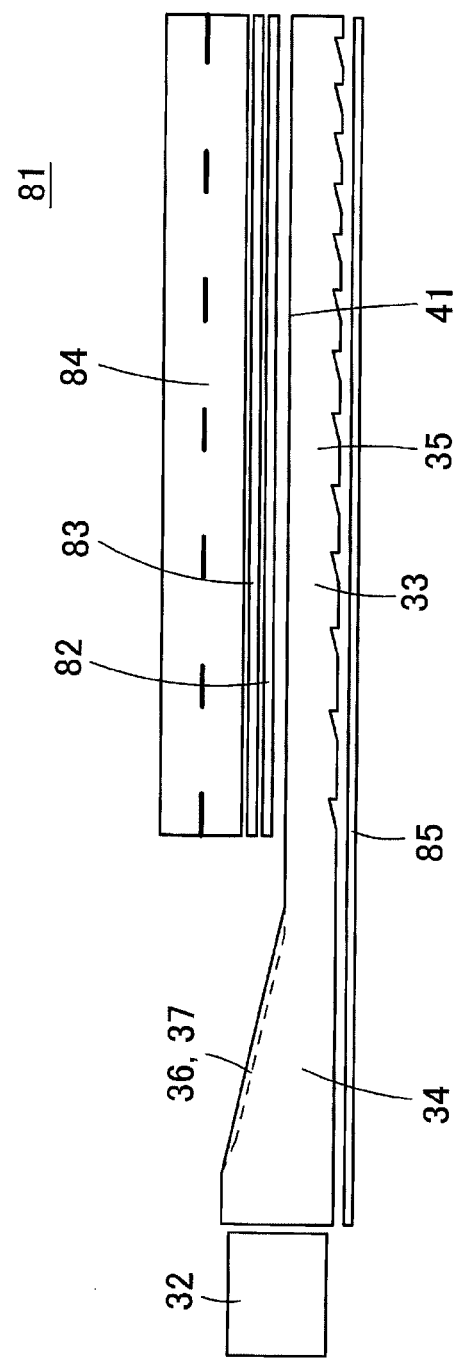
FIG. 12 is a schematic cross-sectional view of a liquid-crystal display device according to one or more embodiments of the present invention.

FIG. 12 is a schematic cross-sectional view of a liquid-crystal display device 81 using the surface light source device according to one or more embodiments of the present invention (the surface light source device 31 in the first embodiment, for example). The liquid-crystal display device 81 has a diffusion plate 82, a prism sheet 83, and a liquid crystal panel 84 that are superposed opposite to a light-emitting surface side of the light guide plate 33, and has a reflection sheet 85 arranged at a rear-surface side of the light guide plate 33. According to the liquid-crystal display device 81, it is possible to take advantage of a characteristic of the surface light source device according to one or more embodiments of the present invention, and it becomes possible to facilitate watching the screen by improving light utilization efficiency of the liquid-crystal display device 81 and also becomes possible to reduce the thickness of the liquid-crystal display device 81.

Sixth Embodiment

Figure 13:
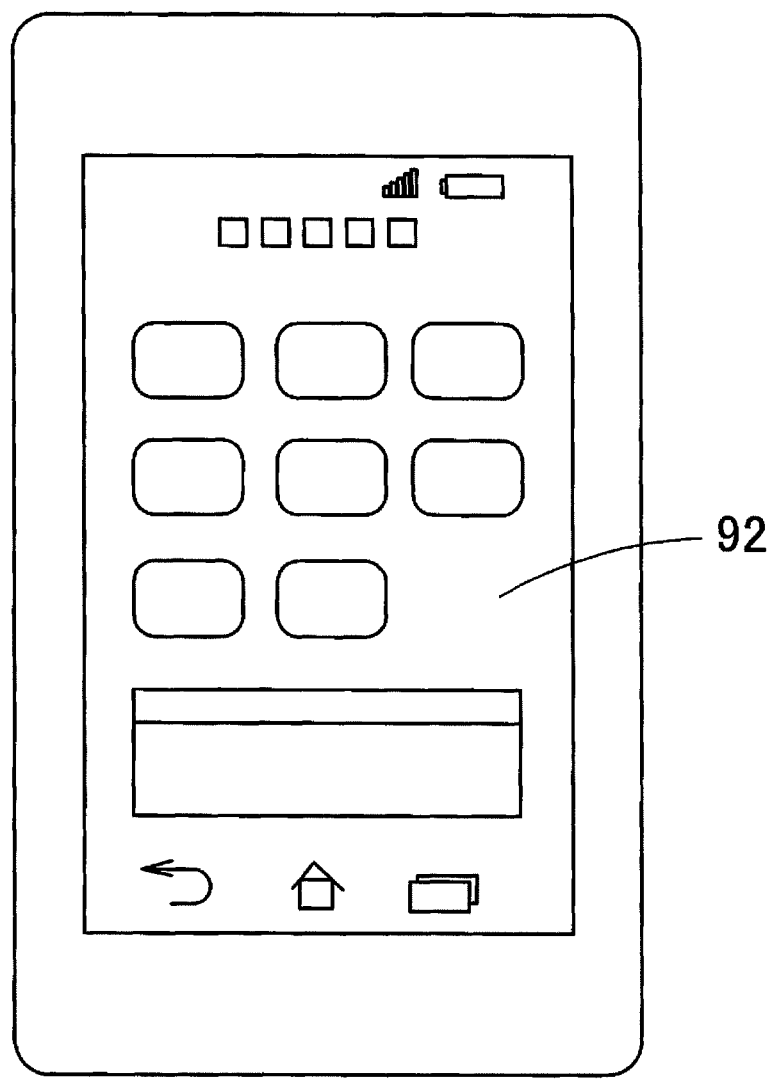
FIG. 13 is a schematic front view of a mobile device according to one or more embodiments of the present invention.

FIG. 13 is a plan view of a mobile device, that is, a smartphone 91 that uses the surface light source device or the liquid-crystal display device according to one or more embodiments of the present invention. The smartphone 91 includes a liquid-crystal display device 92 having a touch panel in the front. When the surface light source device according to one or more embodiments of the present invention is used for the smartphone 91, brightness of the liquid-crystal display device 92 can be increased by improving light utilization efficiency of the surface light source device. Further, the surface light source device according to one or more embodiments of the present invention can be also applied to a mobile device such as a tablet computer, an electronic dictionary, and an electronic book reader, in addition to a portable telephone such as a smartphone.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
    a light introducing portion configured to confine light that is incident from an end surface; and
    a light guide-plate main body configured to emit incident light to an outside from a light emitting surface and provided continuously with the light introducing portion in a thickness smaller than a maximum thickness of the light introducing portion,
    wherein the light introducing portion comprises an inclined surface inclined toward the light guide-plate main body from a surface comprising a larger thickness than a thickness of the light guide-plate main body, on at least one of a surface at a light emission side and a surface opposite to the surface at the light emission side,
    wherein the inclined surface comprises:
        a main-inclined surface configured to be positioned in front of a light source arranged opposite to the end surface,
        a first side-inclined surface disposed on a first side of the main-inclined surface, and
        a second side-inclined surface disposed on a second side of the main-inclined surface,
    wherein a main directional transform pattern is formed to project from a main base plane of the main-inclined surface,
    wherein a first side directional transform pattern is formed to project from a first side base plane of the first side-inclined surface, wherein a second side directional transform pattern is formed to project from a second side base plane of the second side-inclined surface, wherein, when viewed in a thickness direction of the light guide plate, a normal to the main base plane is perpendicular to the end surface, and wherein, when viewed in the thickness direction of the light guide plate, a normal to the first side base plane and a normal to the second side base plane form acute angles with a plane of the end surface.

2. The light guide plate according to claim 1, wherein the first and second side-inclined surfaces are formed continuously with the main-inclined surface.

3. The light guide plate according to claim 1, wherein each of the main directional transform pattern, the first side directional transform pattern, and the second side directional transform pattern is a layout of pattern elements that linearly extend.

4. The light guide plate according to claim 3, wherein the pattern elements of the first side and second side directional transform patterns comprise bilaterally asymmetrical cross-sectional shapes.

5. The light guide plate according to claim 4, wherein the first side and second side directional transform patterns are formed such that a ridge line and a valley line are alternately arranged and a slant surface is formed between the ridge line and the valley line, and wherein, of adjacent ones of the slant surfaces, a slant surface on which an outward normal line is further oriented to a center of the light guide plate than a direction perpendicular to the pattern-element layout direction comprises a smaller width parallel to a pattern-element layout direction than that of a slant surface on which an outward normal line is further oriented to an outer side of the light guide plate than a direction perpendicular to the pattern-element layout direction.

6. The light guide plate according to claim 3, wherein the pattern elements of the main directional transform pattern comprise bilaterally asymmetrical cross-sectional shapes.

7. The light guide plate according to claim 6, wherein the main directional transform pattern is formed such that a ridge line and a valley line are alternately arranged and that a slant surface is formed between the ridge line and the valley line, and wherein, of adjacent ones of the slant surfaces, a slant surface on which an outward normal line is oriented to a center of the light guide plate comprises a larger width parallel to the pattern-element layout direction than that of a slant surface on which an outward normal line is oriented to an outside of the light guide plate.

8. The light guide plate according to claim 1, wherein, when viewed in the thickness direction, upper end edges and lower end edges of the first and second side-inclined surfaces are inclined to the end surface.

9. The light guide plate according to claim 1, wherein, when viewed in the thickness direction, upper end edges of the first and second side-inclined surfaces are inclined to the end surface, and lower end edges of the side-inclined surfaces are parallel with the end surface.

10. The light guide plate according to claim 1, wherein, when viewed in the thickness direction, upper end edges of the first and second side-inclined surfaces are parallel with the end surface, and lower end edges of the side-inclined surfaces are inclined to the end surface.

11. A surface light source device comprising:
the light guide plate according to claim 1; and
a light source configured to transmit light to the end surface of the light introducing portion of the light guide plate.

12. A liquid-crystal display device comprising:
the light guide plate according to claim 1;
a light source configured to transmit light to the end surface of the light introducing portion of the light guide plate; and
a liquid-crystal display panel arranged opposite to the light emitting surface of the light guide plate.

13. A mobile device comprising the liquid-crystal display device according to claim 12.

14. A mobile device comprising:
a liquid-crystal display device comprising:
a light source that emits light;
a light guide plate comprising:
a light introducing portion that confines light that is incident from an end surface opposite the light source on which light from the light source is incident; and
a light guide-plate main body configured to emit incident light to an outside from a light emitting surface and provided continuously with the light introducing portion in a thickness smaller than a maximum thickness of the light introducing portion,
wherein the light introducing portion comprises an inclined surface inclined toward the light guide-plate main body from a surface comprising a larger thickness than a thickness of the light guide-plate main body, on at least one of a surface at a light emission side and a surface opposite to the surface at the light emission side,
wherein the inclined surface comprises:
a main-inclined surface configured to be positioned in front of the light source arranged opposite to the end surface,
a first side-inclined surface disposed on a first side of the main-inclined surface, and
a second side-inclined surface disposed on a second side of the main-inclined surface,
wherein a main directional transform pattern is formed to project from a main base plane of the main-inclined surface,
wherein a first side directional transform pattern is formed to project from a first side base plane of the first side-inclined surface,
wherein a second side directional transform pattern is formed to project from a second side base plane of the second side-inclined surface,
wherein, when viewed in a thickness direction of the light guide plate, a normal to the main base plane is perpendicular to the end surface,
wherein, when viewed in the thickness direction of the light guide plate, a normal to the first side base plane and a normal to the second side base plane form acute angles with a plane of the end surface,
wherein the first and second side-inclined surfaces are formed continuously with the main-inclined surface,
wherein each of the directional transform main directional transform pattern, the first side directional transform pattern, and the second side directional transform pattern is a layout of pattern elements that linearly extend,
wherein the pattern elements of the first side and second side directional transform patterns comprise bilaterally asymmetrical cross-sectional shapes, wherein the first side and second side directional transform patterns are formed such that a ridge line and a valley line are alternately arranged and a slant surface is formed between the ridge line and the valley line, and wherein, of adjacent ones of the slant surfaces, a slant surface on which an outward normal line is further oriented to a center of the light guide plate than a direction perpendicular to the pattern-element layout direction comprises a smaller width parallel to a pattern-element layout direction than that of a slant surface on which an outward normal line is further oriented to an outer side of the light guide plate than a direction perpendicular to the pattern-element layout direction; and a liquid-crystal display panel arranged opposite to the light emitting surface of the light guide plate.

\* \* \* \* \*